United States Patent [19]
Sakaguchi

[11] Patent Number: 5,864,524
[45] Date of Patent: *Jan. 26, 1999

[54] LENS ACTUATOR FOR DUAL LENS OPTICAL DISK APPARATUS HAVING LENS MOUNTING BASE STOPPER AND SELECTED LENS SENSOR

[75] Inventor: Akihiro Sakaguchi, Kawachinagano, Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 800,978

[22] Filed: Feb. 19, 1997

[30] Foreign Application Priority Data

Feb. 23, 1996 [JP] Japan ................................. 8-036064
Feb. 14, 1997 [JP] Japan ................................. 9-030141

[51] Int. Cl.$^6$ ................................................. G11B 7/095
[52] U.S. Cl. ................................ 369/44.21; 369/44.27; 369/54; 369/58
[58] Field of Search ........................ 369/44.14, 44.23, 369/44.27, 54, 58, 111, 112, 44.21; 359/813–814, 823–824

[56] References Cited

U.S. PATENT DOCUMENTS 5,729,510  3/1998  Kasahara et al. ..................... 369/44.14

FOREIGN PATENT DOCUMENTS 0727776  8/1996  European Pat. Off. .

Primary Examiner—W. R. Young
Attorney, Agent, or Firm—Wenderoth, Lind & Ponack, L.L.P.

[57] ABSTRACT

A lens actuator for use in an optical data reader, comprising: a base on which a plurality of N (N=natural number not less than two) objective lenses corresponding to N optical data recording media having substrates of different thicknesses, respectively are mounted; a supporting shaft which is provided on the base such that the base is movable vertically and rotatable within predetermined ranges, respectively relative to the supporting shaft; a pair of driving coils for performing changeover among the objective lenses and tracking follow-up of the data recording media; and N pairs of magnets which form a magnetic circuit together with the driving coils such that the base is rotated by the driving coils and the magnets.

3 Claims, 8 Drawing Sheets

LENS ACTUATOR FOR DUAL LENS OPTICAL DISK APPARATUS HAVING LENS MOUNTING BASE STOPPER AND SELECTED LENS SENSOR

BACKGROUND OF THE INVENTION

The present invention generally relates to an apparatus for reading, recording and erasing minute data recorded on concentric or helical tracks of a disk by converging light thereon and more particularly, to a lens actuator for use in the apparatus.

For example, an audio data recording medium, a video disk and an optical disk are known as a data recording medium in which data is recorded on tracks. Data tracks on these data recording media are arranged concentrically or helically. It is known that an apparatus for reading such data optically includes an optical system for irradiating a beam spot on the data recording medium and a position detecting means for detecting relative position between the data tracks and the beam spot on the data recording medium.

FIG. 9 shows conceptually a conventional optical reader for reading the audio data recording medium, the video disk and the optical disk. A beam emitted from a laser light source 3 is converged on a data recording medium 1 through a collimating lens 4, a reflecting mirror 5 and an objective lens 2. A substrate of the data recording medium 1 has a thickness of 1.2 mm. The objective lens 2 is arranged to converge the beam on a recording layer of the data recording medium 1 through the substrate of 1.2 mm in thickness. Intensity of the beam reflected from the data recording medium 1 varies according to data of the data recording medium 1. Thus, by detecting intensity of the beam by a photodetector 7 via a detecting lens 6, the data recorded on the data recording medium 1 can be obtained as an electrical output.

Meanwhile, a data recording medium for high-density recording is newly proposed and has a substrate of 0.6 mm in thickness. Therefore, it is necessary for this data recording medium to provide another objective lens for converging the beam on a recording layer through the substrate of 0.6 mm in thickness.

FIG. 10 shows a known lens actuator utilizing the two kinds of the objective lenses through their changeover. In this known lens actuator, an objective lens 102 for the substrate of 1.2 mm in thickness and an objective lens 108 for the substrate of 0.6 mm in thickness are mounted on a base 110. For changeover of the objective lenses 102 and 108, the objective lenses 102 and 108 are rotated relative to a supporting shaft 109 so as to come to a center of the beam from the laser light source. A magnetic circuit for performing changeover of the objective lenses 102 and 108 and tracking follow-up of the data recording medium includes two pairs of driving coils 111 attached to the base 110, two pairs of iron pieces 112 fixed to the base 110 and a pair of magnets 113. The objective lenses 102 and 108 are positioned through their changeover by the iron pieces 122 and the magnets 113, while tracking is performed by the driving coils 111. At the time changeover between the objective lenses 102 and 108 is performed, large pulsating current is applied to the driving coils 111. Thus, it is possible to perform reproduction, recording and erasure on the data recording media having the substrates of different thicknesses.

In this known lens actuator of FIG. 10, the following problems arise. Since each of data tracks recorded on the data recording medium has a width of not more than 1 $\mu$m and an interval of the tracks is about 1 $\mu$m, control target of focusing of the objective lenses should be set at not more than ±0.1 82 m and tracking control in which the beam spot follows up the tracks should be set at not more than +0.1 $\mu$m. Hence, it is quite essential that a movable member including the objective lenses not only is compact and light but has a balanced configuration such that an optical axis of each of the objective lenses is not inclined when the movable member is driven.

Furthermore, when focusing and tracking are performed on the data recording media having the substrates of different thicknesses, a plurality of the objective lenses should be mounted on the single movable member. Accordingly, conventionally, it has been extremely difficult to optimize focusing and tracking control such that a plurality of the objective lenses are accurately driven independently of one another.

Meanwhile, since tracking control and changeover of the objective lenses in accordance with the thicknesses of the substrates of the data recording media have an identical driving direction and are, respectively, provided with separate magnetic arrangements, the lens actuator and its control circuit become complicated structurally. Therefore, it has been quite difficult to simplify construction of a lens actuator which has functions of identifying an objective lens proper for the data recording medium and effecting changeover between the objective lenses and is capable of performing focusing and tracking control accurately.

Another known lens actuator utilizing the two kinds of the objective lenses through their changeover is shown in FIG. 11. In this known lens actuator, an objective lens 202 for the substrate of 1.2 mm in thickness and an objective lens 208 for the substrate of 0.6 mm in thickness are mounted on a base 210. For changeover of the objective lenses 202 and 208, the objective lenses 202 and 208 are rotated relative to a supporting shaft 209 so as to come to a center of the beam from the laser light source. A magnetic drive mechanism for performing changeover of the objective lenses 202 and 208 and tracking follow-up and focusing follow-up of the data recording medium is constituted by a pair of focusing magnets 214 subjected to bipolar magnetization vertically as shown in FIG. 12, a pair of tracking magnets 213 subjected to bipolar magnetization laterally and a pair of coils 221 and a pair of coils 222 which are mounted on the base 210 so as to confront the focusing magnets 214 and the tracking magnets 213, respectively. Furthermore, the objective lenses 202 and 208 are positioned in a tracking direction by four iron pieces 212.

When the coils 221 confront the focusing magnets 214, respectively as shown in FIG. 11, the coils 221 function as focusing drive coils. At this time, since the coils 222 confront the tracking magnets 213, respectively, the coils 222 function as tracking drive coils. If the coils 221 confront the tracking magnets 213, respectively upon changeover between the objective lenses 202 and 208, the coils 221 function as the tracking drive coils. Therefore, the two tracking magnets 213 are provided for the two objective lenses 202 and 208.

In this known arrangement of FIG. 11, the following inconveniences are incurred. Since driving directions of the coils 221 and 222 are switched between focusing direction and tracking direction upon changeover between the objective lenses 202 and 208, it is necessary to judge which one of the objective lenses 202 and 208 is being controlled. Furthermore, each time changeover between the objective lenses 202 and 208 is performed, it is necessary to electrically switch between focusing control and tracking control driving current flowing through the coils 221 and 222. Therefore, configuration of an electric circuit of the known lens actuator of FIG. 11 becomes extremely complicated and thus, control of the known lens actuator of FIG. 11 is quite difficult.

SUMMARY OF THE INVENTION

Accordingly, an essential object of the present invention is to provide, with a view to eliminating the above mentioned disadvantages of prior art, a lens actuator in which a movable member including N (N=natural number not less than two) objective lenses corresponding to N data recording media having substrates of different thicknesses, respectively is moved vertically and rotated, by a driving member including a pair of tracking drive coils and a pair of iron pieces provided on the movable member and N pairs of magnets, within predetermined ranges, respectively relative to a supporting shaft provided on the movable member and tracking control and changeover of the objective lenses can be performed by applying different control currents to the tracking drive coils such that the lens actuator is quite simplified structurally.

Another object of the present invention is to provide a lens actuator in which the magnet confronting the tracking drive coil of the movable member is adjustably displaced minutely in a rotational direction of the movable member such that in tracking control after selection of one of the objective lenses optimum for the data recording medium, the objective lens can be controlled at an optimum position.

In order to accomplish these objects of the present invention, a lens actuator for use in an optical data reader including a light source, an optical data recording medium having data recorded concentrically or helically thereon, an optical means for guiding a luminous flux from the light source, as an irradiation beam, to the data recording medium and a detection means for detecting the data from the data recording medium such that the irradiation beam and the data recording medium are moved relative to each other by the lens actuator, according to one embodiment of the present invention comprises: a base on which a plurality of N (N=natural number not less than two) objective lenses corresponding to N optical data recording media having substrates of different thicknesses, respectively are mounted; a supporting shaft which is provided on the base such that the base is movable vertically and rotatable within predetermined ranges, respectively relative to the supporting shaft; a pair of driving coils for performing changeover among the objective lenses and tracking follow-up of the data recording media; and N pairs of magnets which form a magnetic circuit together with the driving coils such that the base is rotated by the driving coils and the magnets.

In accordance with the present invention, focusing and tracking control of the data recording media having substrates of different thicknesses, respectively is stabilized remarkably.

BRIEF DESCRIPTION OF THE DRAWINGS

These objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Hereinafter, first to eighth embodiments of the present invention are described with reference to FIGS. 1 to 8, respectively.

Figure 1:
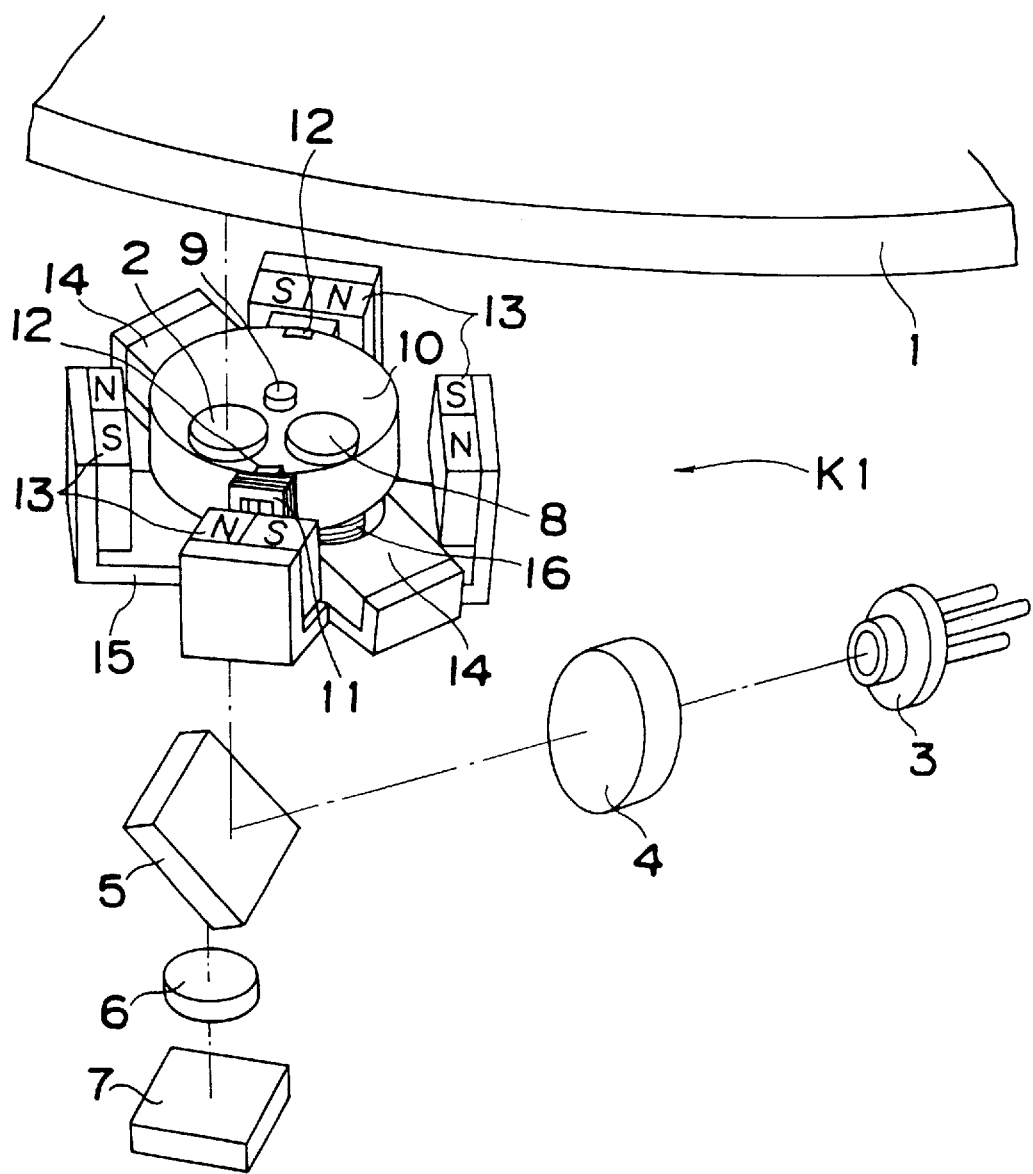
FIG. 1 is a perspective view of a lens actuator according to a first embodiment of the present invention.

FIG. 1 shows a lens actuator K1 for use in an optical data reader, according to a first embodiment of the present invention. In the lens actuator K1, first and second objective lenses 2 and 8 are mounted on one end portion of a face of a circular base 10. A pair of driving coils 11, a pair of iron pieces 12 and a focusing coil 16 are also integrally attached to the base 10. A supporting shaft 9 is inserted through a guide hole formed at a central portion of the base 10 so as to move the base 10 in a focusing direction. The focusing coil 16 is wound around the supporting shaft 9. A pair of focusing magnets 14 are provided via yokes 15, respectively so as to confront the focusing coil 16. Since the supporting shaft 9 is made of stainless material having magnetic properties, efficiency of a magnetic circuit of the lens actuator K1 is raised. When control current is supplied to the focusing coil 16, the base 10 can be moved in the focusing direction.

Meanwhile, the driving coils 11 are spirally wound into a square shape and are mounted at opposite positions on a side face of the base 10 such that a straight line connecting the driving coils 11 extends between the first and second objective lenses 2 and 8. Likewise, the iron pieces 12 are symmetrically mounted on portions of the base 10, i.e., inner side faces of the driving coils 11, respectively such that a straight line connecting the iron pieces 12 extends between the first and second objective lenses 2 and 8.

Figure 2:
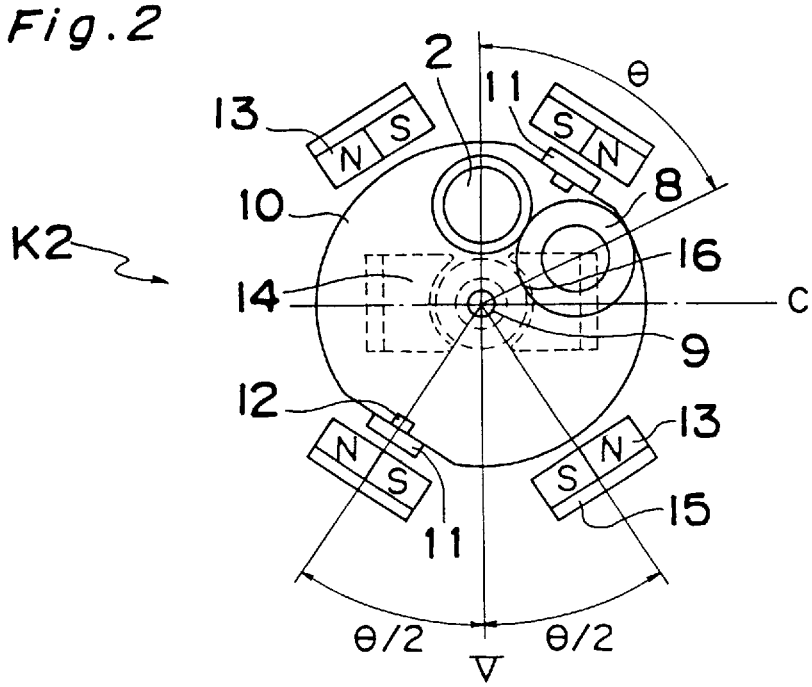
FIG. 2 is a top plan view of a lens actuator according to a second embodiment of the present invention.

Assuming that an angle θ is formed between a straight line connecting the first objective lens 2 and the supporting shaft 9 and a straight line connecting the second objective lens 8 and the supporting shaft 9 as shown in FIG. 2, a pair of tracking magnets 13 are, respectively, mounted on the yokes 15 so as to be shifted in circumferentially opposite directions by an angle of (Θ/2) from an axis V perpendicular to a central axis C of the focusing magnets 14, while another pair of the tracking coils 13 are provided so as to confront said pair of the tracking magnets 13 with respect to the base 10. Tracking is performed by driving each of the first and second objective lenses 2 and 8 with one pair of the tracking magnets 13. Each of the tracking magnets 13 is subjected to bipolar magnetization as shown in FIG. 1. Centering at the time of tracking is performed on a straight line connecting each of the iron pieces 12 and a boundary line between N- and S-poles of each of the tracking magnets 13. When driving current is caused to flow through the driving coils 11, the base 10 can be rotated relative to the supporting shaft 9.

Furthermore, in order to effect changeover between the first and second objective lenses 2 and 8, pulsating driving current is applied to the driving coils 11. Two vertical side portions of each of the driving coils 11, which are effective for tracking drive, start travel in a tracking direction upon application of positive pulses to the driving coils 11 and continue to allow positive pulses to flow therethrough until both of the two vertical side portions of each of the driving coils 11 reach an S-pole of each of the tracking magnets 13 which are subjected to bipolar magnetization. If negative pulses are applied to the driving coils 11 immediately thereafter, the base 10 continues rotation in the same direction. Then, if supply of driving current is stopped when the two vertical side portions of each of the driving coils 11 have moved away from the tracking magnets 13, the iron pieces 12 are attracted by the neighboring tracking magnets 13 and thus, changeover of the first and objective lenses 2 and 8 is performed. If driving current is caused to flow through the driving coils 11 at this position, tracking of one of the first and second objective lenses 2 and 8 can be performed. In order to effect further changeover between the first and second objective lenses 2 and 8, opposite pulses are applied to the driving coils 11.

FIG. 1 shows an example in which a beam emitted from a laser light source 3 is converged on a data recording medium 1 via a collimating lens 4, a reflecting mirror 5 and the first objective lens 2 and then, is reflected from the data recording medium 1 so as to be detected by a photodetector 7 through a detecting lens 6.

In this embodiment, focusing and tracking control for the data recording media having substrates of different thicknesses, respectively is optimized so as to be performed independently of each other and accurately with a plurality of the objective lenses mounted on the single movable member. Meanwhile, the lens actuator having functions of identifying the objective lens proper for the data recording medium in tracking control and changeover of the objective lenses in accordance with the thicknesses of the substrates of the data recording media, which have an identical driving direction and effecting changeover of the objective lenses in accordance with the thicknesses of the substrates of the data recording media and capable of performing focusing and tracking control accurately can be simplified structurally.

FIG. 2 shows a lens actuator K2 according to a second embodiment of the present invention. In the lens actuator K2, the tracking magnets 13 are provided such that the neighboring tracking magnets 13 have an identical polarity. Meanwhile, changeover between the first and second objective lenses 2 and 8 is performed in the same manner as the lens actuator K1. In the lens actuator K2, since the neighboring tracking magnets 13 have an identical polarity, changeover between the first and second objective lenses 2 and 8 is performed by a pulse generator in which without switching positive and negative directions of pulses for effecting changeover between the first and second objective lenses 2 and 8, pulses of one direction are utilized. Since other constructions of the lens actuator K2 are similar to those of the lens actuator K1 of FIG. 1, the description is abbreviated for the sake of brevity.

In this embodiment, changeover of the objective lenses can be performed by quite simple mechanical and circuit constructions.

Figure 3:
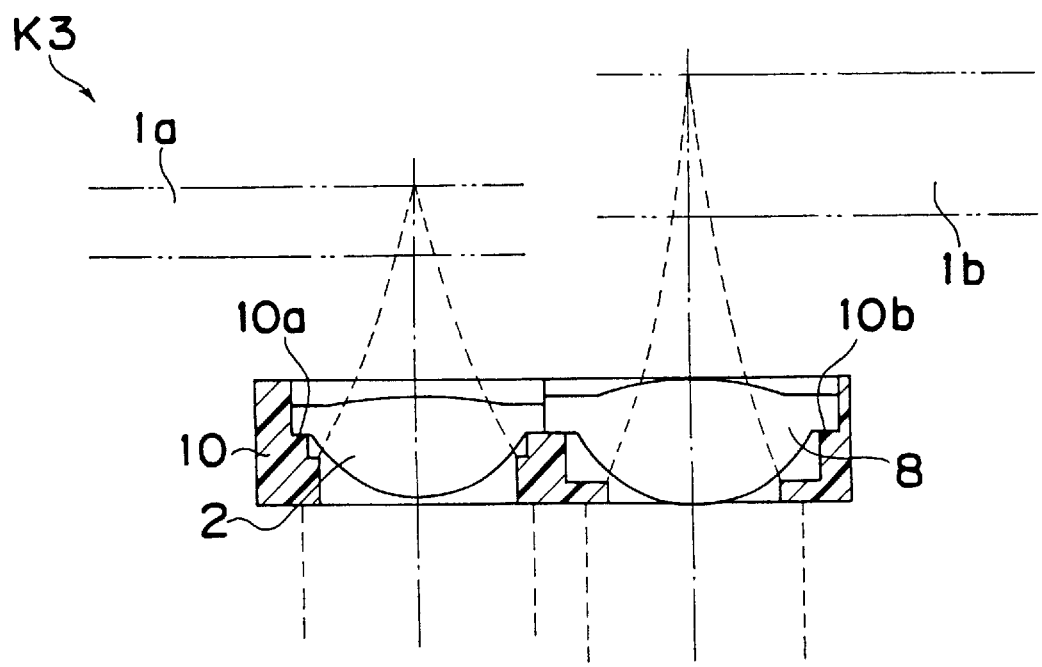
FIG. 3 is a fragmentary vertical sectional view of a lens actuator according to a third embodiment of the present invention.

FIG. 3 shows a lens actuator K3 according to a third embodiment of the present invention. In the lens actuator K3, when the first and second objective lenses 2 and 8 are mounted on the base 10, a lens mounting surface 10a of the base 10, on which the first objective lens 2 is mounted, is made flush with a lens mounting surface 10b of the base 10, on which the second objective lens 8 is mounted, so that flatness accuracy of the lens mounting surfaces 10a and 10b of the base 10 for the first and second objective lenses 2 and 8 can be improved remarkably. In this embodiment, flapping adjustments of the lens actuator K3 are performed such that optimum image forming state is obtained when the first objective lens 2 forms an image on a data recording medium 1a. Also when the first objective lens 2 has been changed over to the second objective lens 8 for forming an image on a data recording medium 1b, optimum image forming state can be maintained. Since other constructions of the lens actuator K3 are similar to those of the lens actuator K1 of FIG. 1, the description is abbreviated for the sake of brevity.

Figure 4:
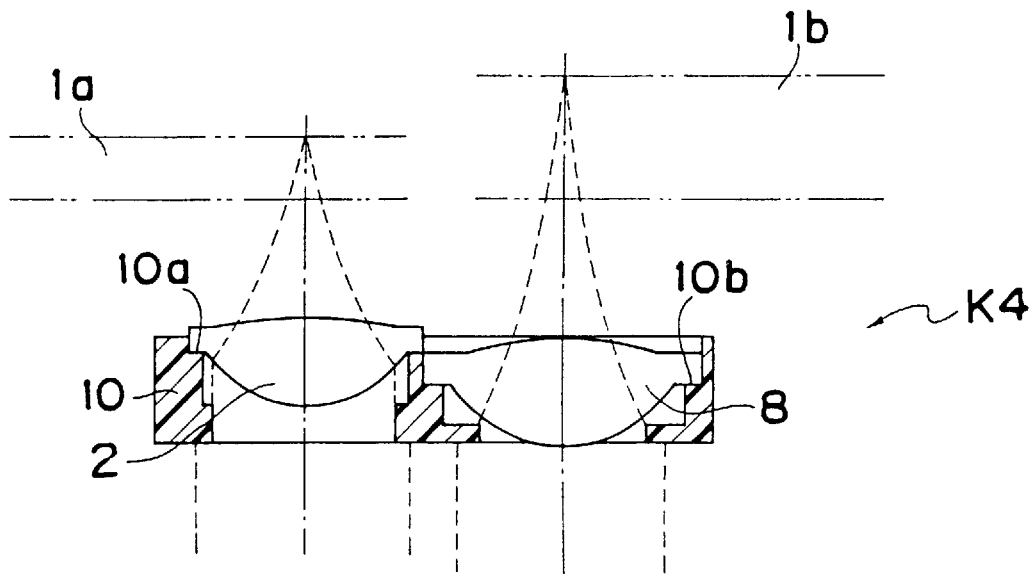
FIG. 4 is a fragmentary vertical sectional view of a lens actuator according to a fourth embodiment of the present invention.

FIG. 4 shows a lens actuator K4 according to a fourth embodiment of the present invention. In the lens actuator K4, when the first and second objective lenses 2 and 8 are mounted on a face of the base 10, the lens mounting surface 10a of the base 10, on which the first objective lens 2 is mounted made different in height from the lens mounting surface 10b of the base 10, on which the second objective lens 8 is mounted such that a distance between the first objective lens 2 and the data recording medium 1a and a distance between the second objective lens 8 and the data recording medium 1b are equal to each other. In focusing control, driving current is applied to the focusing coil 16 such that the objective lens is disposed at an optimum image forming position relative to the data recording medium 1. Even if the first objective lens 2 has been changed over to the second objective lens 8 or vice versa at this time, positional relation of the first and second objective lenses 2 and 8 is kept unchanged. Since other constructions of the lens actuator K4 are similar to those of the lens actuator K1 of FIG. 1, the description is abbreviated for the sake of brevity.

Figure 5:
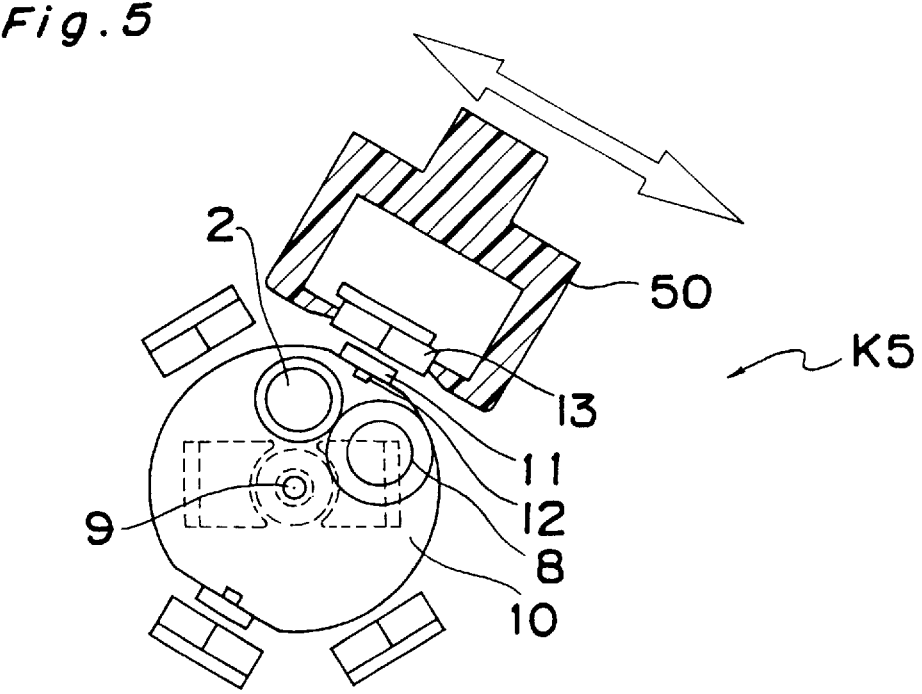
FIG. 5 is a top plan view of a lens actuator according to a fifth embodiment of the present invention.

FIG. 5 shows a lens actuator K5 according to a fifth embodiment of the present invention. This embodiment is directed to tracking control. When driving current is caused to flow through the driving coils 11, the base 10 can be rotated relative to the supporting shaft 9. At this time, the first objective lens 2 and track pits of the data recording medium 1a are adjusted to optimum positions by using the photodetector 7 as shown in FIG. 1. If the first objective lens 2 is changed over to the second objective lens 8 in this state, positional relation between an optical axis of the second objective lens 8 and track pits of the data recording medium 1b changes. In order to correct this change of positional relation between the optical axis of the second objective lens 8 and the track pits of the data recording medium 1b, a mechanism 50 for moving in the direction of the arrow shown in FIG. 5, one tracking magnet 13 most adjacent to the second objective lens 8 is additionally provided. Since other constructions of the lens actuator K5 are similar to those of the lens actuator K1 of FIG. 1, the description is abbreviated for the sake of brevity.

In this embodiment, when changeover of the objective lenses has been performed, change of positional relation between the optical axis of the objective lens and the track pits of the data recording medium can be corrected.

Figure 6:
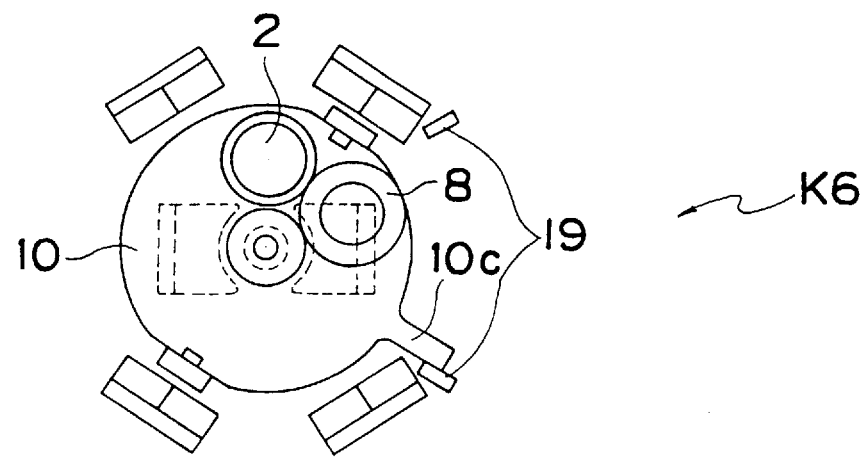
FIG. 6 is a top plan view of a lens actuator according to a sixth embodiment of the present invention.

FIG. 6 shows a lens actuator K6 according to a sixth embodiment of the present invention. In this embodiment, a pair of stoppers 19 are provided. When changeover between the first and second objective lenses 2 and 8 is performed, a portion of the base 10, for example, a projection 10c is brought into contact with the stoppers 19 such that the base 10 is not rotated excessively more than necessary. Thus, when rotational force for the base 10, which changes at the time of changeover between horizontal use and vertical use of the lens actuator K6, can be absorbed. At this time, driving current which is caused to flow through the driving coils 11 for the purpose of changeover between the first and second objective lenses 2 and 8 is set at a value slightly larger than a predetermined one. As a result, changeover between the first and second objective lenses 2 and 8 can be performed smoothly. It is desirable that the stoppers 19 are made of elastic material such as rubber so as to absorb shocks. Since other constructions of the lens actuator K6 are similar to those of the lens actuator K1 of FIG. 1, the description is abbreviated for the sake of brevity.

In this embodiment, changeover of the objective lenses can be performed smoothly and positively.

Figure 7:
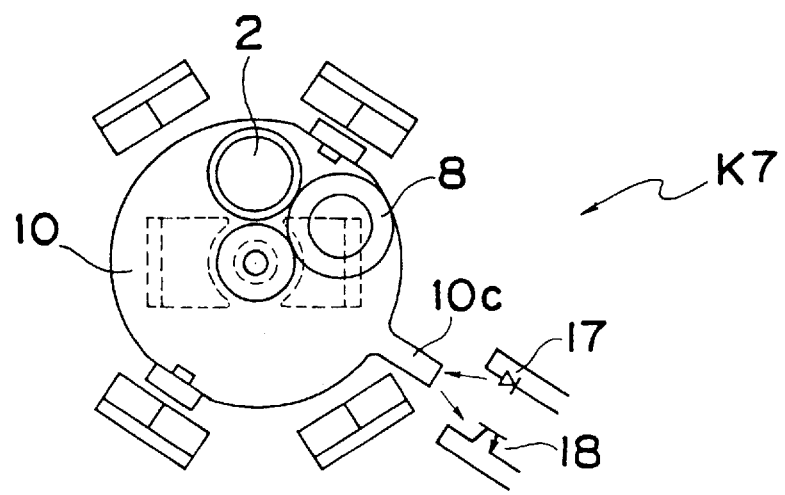
FIG. 7 is a top plan view of a lens actuator according to a seventh embodiment of the present invention.

FIG. 7 shows a lens actuator K7 according to a seventh embodiment of the present invention. In the lens actuator K7, the first and second objective lenses 2 and 8 can be identified at the time of changeover therebetween. To this end, the projection 10c is formed on the base 10, while a light emitting diode 17 and a photosensor 18 are provided at a location of one of the stoppers 19 of FIG. 6 as shown in FIG. 7 such that when light is emitted from the light emitting diode 17 to the projection 10c in a state where the first objective lens 2 is disposed at such a position as to be capable of reading data of the data recording medium 1a, reflected light from the projection 10c is received by the photosensor 18. When the first objective lens 2 has been changed over to the second objective lens 8 so as to be disposed at the position capable of reading data of the data recording medium 1b, light is emitted from the light emitting diode 17 towards the base 10. At this time, since the projection 10c of the base 10 is displaced from the previous position, reflected light from the projection 10c does not exist and thus, cannot be detected by the photosensor 18. By this arrangement, it is possible to discern whether the first objective lens 2 or the second objective lens 8 is being used. Since other constructions of the lens actuator K7 are similar to those of the lens actuator K1 of FIG. 1, the description is abbreviated for the sake of brevity.

In this embodiment, it is possible to positively discern which one of a plurality of the objective lenses is being used.

Figure 8:
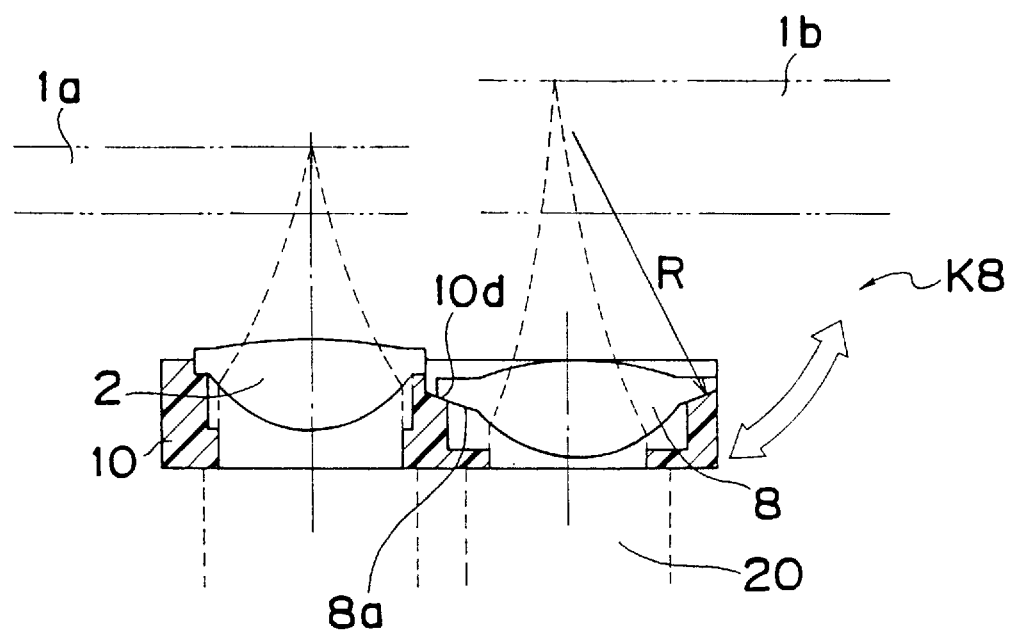
FIG. 8 is a fragmentary schematic side elevational view of a lens actuator according to an eighth embodiment of the present invention.
Figure 9:
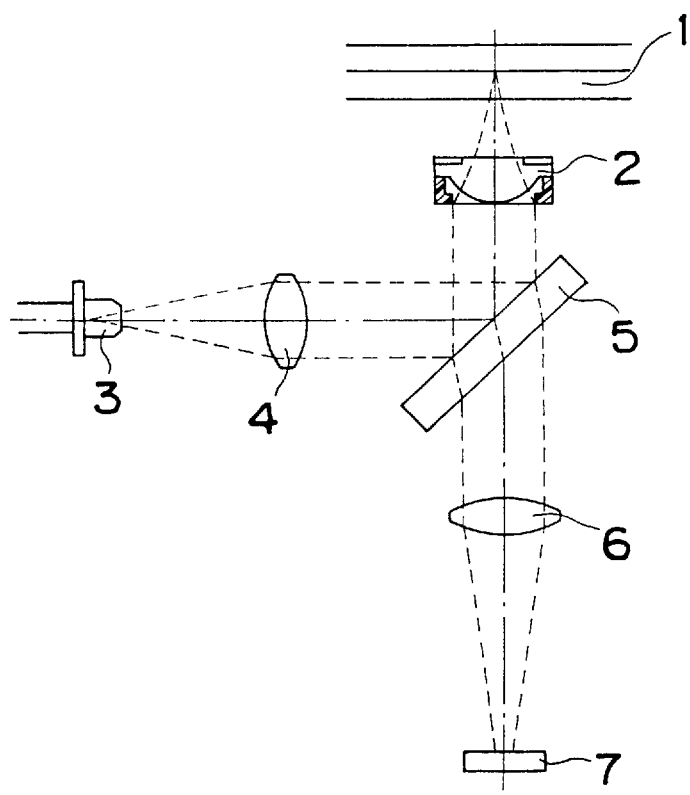
FIG. 9 is a schematic side elevational view of a prior art optical reader.
Figure 10:
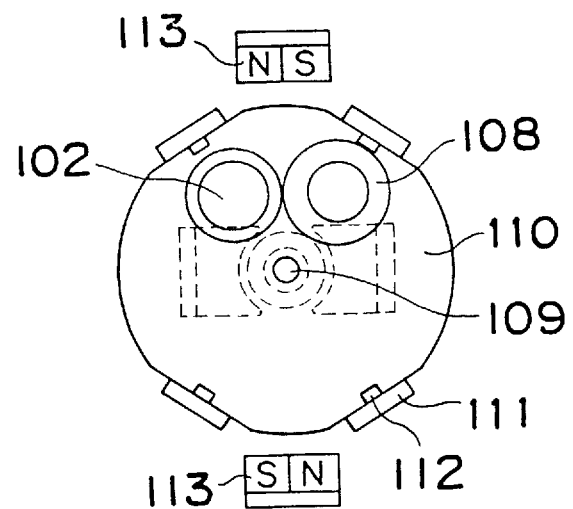
FIG. 10 is a top plan view of a prior art lens actuator.
Figure 11:
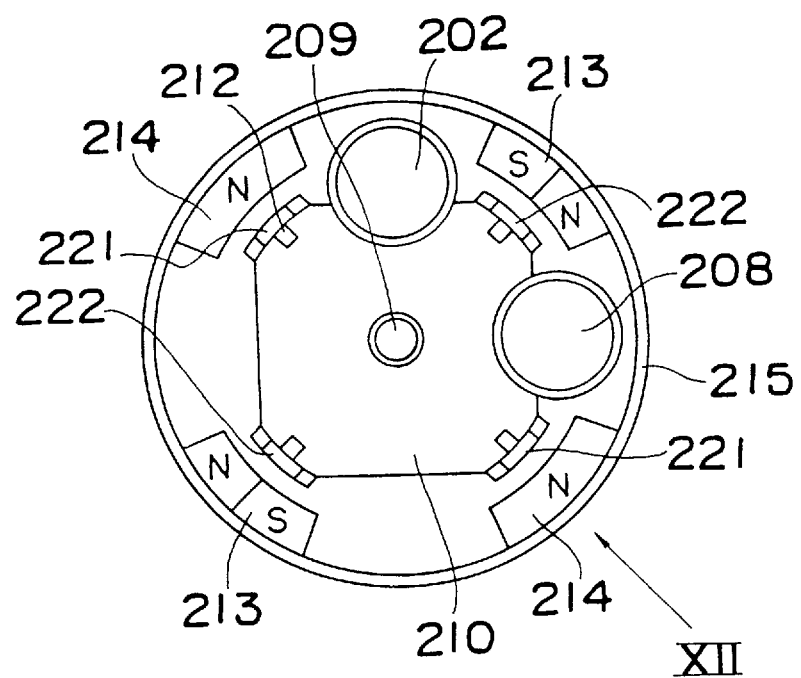
FIG. 11 is a top plan view of another prior art lens actuator.
Figure 12:
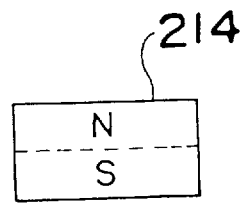
FIG. 12 is a view as observed in the direction of the arrow XII in FIG. 11.

FIG. 8 shows a lens actuator K8 according to an eighth embodiment of the present invention. An input beam 20 from the laser light source 3 is incident on the data recording medium from below the first and second objective lenses 2 and 8 mounted on the base 10. Flapping adjustments of the lens actuator K8 are performed such that image forming performance of the first objective lens 2 is optimized. At this time, optimum image forming performance of the first objective lens 2 can be obtained. In order to prevent failure to achieve optimum image forming performance of the second objective lens 8 due to mounting errors between the first and second objective lenses 2 and 8, comatic aberration caused by angular error of a mounting surface 8a of the second objective lens 8 with respect to an image forming position, flapping adjustments of the second objective lens 8 are performed. In order to smoothly perform flapping adjustments of the second objective lens 8, the mounting surface 8a of the second objective lens 8 is formed spherically. At this time, a radius R of the sphere of the mounting surface 8a of the second objective lens 8 is made identical with a focal length of the second objective lens 8 such that the image forming position of the second objective lens 8 does not change even at the time of flapping adjustments of the second objective lens 8. Meanwhile, since a lens mounting surface 10d of the base 10, which is brought into contact with the mounting surface 8a of the second objective lens 8, is also formed spherically, flapping adjustments of the second objective lens 8 can be performed smoothly. Accordingly, by performing flapping adjustments of the first and second objective lenses 2 and 8, image forming performance of the first and second objective lenses 2 and 8 for the input beam 20 can be optimized. Since other constructions of the lens actuator K8 are similar to those of the lens actuator K1 of FIG. 1, the description is abbreviated for the sake of brevity.

In this embodiment, since flapping adjustments for the objective lenses can be performed, image forming performance of a plurality of the objective lenses in response to input light can be optimized at all times.

As is clear from the foregoing description of the present invention, the movable member including the objective lenses not only is compact and light but has a balanced configuration such that an optical axis of each of the objective lenses is not inclined when the movable member is driven. In addition, when focusing and tracking are performed for the data recording media having substrates of different thicknesses, a plurality of the objective lenses can be mounted on the single movable member. Meanwhile, focusing and tracking control can also be optimized such that a plurality of the objective lenses can be driven independently of one another accurately. Meanwhile, since the single magnetic arrangement is provided for tracking control and changeover of the objective lenses in accordance with the thicknesses of the substrates of the data recording media, which have an identical driving direction, the lens actuator and its control circuit can be simplified structurally. In addition, it is possible to simplify construction of the lens actuator which has functions of identifying the objective lens proper for the data recording medium and effecting changeover between the objective lenses and is capable of performing focusing and tracking control accurately.

What is claimed is:

1. A lens actuator for use in an optical data reader including a light source, an optical data recording medium having data recorded concentrically or helically thereon, an optical means for guiding a luminous flux from the light source, as an irradiation beam, to the data recording medium and a detection means for detecting the data from the data recording medium such that the irradiation beam and the data recording medium are moved relative to each other by the lens actuator, the lens actuator comprising:

a base on which two objective lenses corresponding to two optical data recording media having substrates of different thicknesses, respectively are mounted;

a supporting shaft which is provided on the base such that the base is movable vertically and rotatable within predetermined ranges, respectively relative to the supporting shaft;

a pair of driving coils for performing changeover among the objective lenses and tracking follow-up of the data recording media;

two pairs of magnets which form a magnetic circuit together with the driving coils such that the base is rotated by the driving coils and the two pairs of magnets;

a stopper which comes into contact with a portion of the base when the two objective lenses are changed over to their setting positions, respectively; and a sensor for discerning between the two objective lenses, which is provided at a location of the stopper.

2. A lens actuator for use in an optical data reader including a light source, an optical data recording medium having data recorded concentrically or helically thereon, an optical means for guiding a luminous flux from the light source, as an irradiation beam, to the data recording medium and a detection means for detecting the data from the data recording medium such that the irradiation beam and the data recording medium are moved relative to each other by the lens actuator, the lens actuator comprising:

a base on which two objective lenses corresponding to two optical data recording media having substrates of different thicknesses, respectively are mounted;

a supporting shaft which is provided on the base such that the base is movable vertically and rotatable within predetermined ranges, respectively relative to the supporting shaft;

a pair of driving coils for performing changeover among the objective lenses and tracking follow-up of the data recording media;

two pairs of magnets which form a magnetic circuit together with the driving coils such that the base is rotated by the driving coils and the two pairs of magnets, wherein the two pairs of magnets are subjected to bipolar magnetization in a rotation direction of the base such that a direction of polarity of one of neighboring two of the two pairs of magnets is opposite to that of the other of the neighboring two of the two pairs of magnets;

a stopper which comes into contact with a portion of the base when the two objective lenses are changed over to their setting positions, respectively; and a sensor for discerning between the two objective lenses, which is provided at a location of the stopper.

3. A lens actuator for use in an optical data reader including a light source, an optical data recording medium having data recorded concentrically or helically thereon, an optical means for guiding a luminous flux from the light source, as an irradiation beam, to the data recording medium and a detection means for detecting the data from the data recording medium such that the irradiation beam and the data recording medium are moved relative to each other by the lens actuator, the lens actuator comprising:

a base on which two objective lenses corresponding to two optical data recording media having substrates of different thicknesses, respectively are mounted;

a supporting shaft which is provided on the base such that the base is movable vertically and rotatable within predetermined ranges, respectively relative to the supporting shaft;

a pair of driving coils for performing changeover among the objective lenses and tracking follow-up of the data recording media;

two pairs of magnets which form a magnetic circuit together with the driving coils such that the base is rotated by the driving coils and the two pairs of magnets;

a mechanism for moving the two pairs of magnets relative to the supporting shaft in a rotational direction of the base such that fine adjustments of setting positions of the objective lenses can be performed by the driving coils and the two pairs of magnets;

a stopper which comes into contact with a portion of the base when the two objective lenses are changed over to their setting positions, respectively; and a sensor for discerning between the two objective lenses, which is provided at a location of the stopper.

* * * * *

UNITED STATES PATENT AND TRADEMARK OFFICE
CERTIFICATE OF CORRECTION

PATENT NO. : 5,864,524
DATED :
INVENTOR(S) : January 26, 1999          Page 1 of 7

Akihiro SAKAGUCHI

It is certified that error appears in the above-identified patent and that said Letters Patent is hereby corrected as shown below:

Title page,

Item 57,    Abstract, line 1, delete ":";

line 5, change "are mounted:" to --, are mounted--;

line 7, after "respectively" insert --,--;

line 8, change ":" to --,--;

line 10, change ":" to --,--.

Column 1,    line 9, after "recording" insert --,--;

line 11, after "thereon" insert --,--;

line 14, after "disk" insert --,--;

line 20, change "position" to --positions--;

line 23, after "disk" insert --,--;

line 26, after "5" insert --,--;

line 30, change "of 1.2mm in thickness intensity" to --having a thickness of 1.2mm. An intensity--;

line 33, after "detecting" insert --the--;

UNITED STATES PATENT AND TRADEMARK OFFICE
CERTIFICATE OF CORRECTION

PATENT NO. : 5,864,524
DATED : January 26, 1999
INVENTOR(S) : Akihiro SAKAGUCHI

It is certified that error appears in the above-identified patent and that said Letters Patent is hereby corrected as shown below:

Column 1, line 37, after "substrate" insert --having a thickness--;

line 38, delete "in thickness";

line 40, after "substrate" insert --having a thickness--;

line 41, delete "in thickness";

line 45, after "substrate" insert --having a thickness-- and delete "in the thickness";

line 46, after "substrate" insert --having a thickness-- and delete "mm in thickness";

line 47, after "For" insert --performing a--;

line 49, change "come to" to --be located at--;

line 51, before "changeover" insert --the--;

line 54, after "110" insert --,--;

line 61, after "recording" insert --,--;

line 67, after "," insert --a--.

Column 2, line 22, change "complicated structurally" to --structurally complicated--;

line 24, change "proper" to --properly--;

line 31, after "substrate" insert --having a thickness-- and delete "in thickness";

UNITED STATES PATENT AND TRADEMARK OFFICE
CERTIFICATE OF CORRECTION

PATENT NO. : 5,864,524
DATED : January 26, 1999
INVENTOR(S) : Akihiro SAKAGUCHI

It is certified that error appears in the above-identified patent and that said Letters Patent is hereby corrected as shown below:

Column 2, line 32, after "substrate" insert --having a thickness-- and delete "in thickenss";

line 33, after "For" insert --performing a--;

line 35, change "come to " to --be located at--;

line 40, after "to" insert --vertical-- and change "vertically" to --laterally--;

line 42, change "laterally and" to --,--;

line 44, after "214" insert --,--;

line 49, after "respectively" insert --,--;

line 53, after "respectively" insert --,--;

line 59, after "Since" insert --the--;

line 60, after "between" insert --a--;

line 61, after "and" insert --a--; and after "upon" insert --performing a--;

line 66, after "between" insert --a--; and after "and" insert --a--.

Column 3, line 2, after "," insert --the--;

line 10, change "to" to --toward--;

line 11, after "of" insert --the--;

line 15, before "is" insert --,-- and before "by" delete --,--;

line 18, after "respectively" insert --,--;

UNITED STATES PATENT AND TRADEMARK OFFICE
CERTIFICATE OF CORRECTION

PATENT NO. : 5,864,524
DATED : January 26, 1999
INVENTOR(S) : Akihiro SAKAGUCHI

It is certified that error appears in the above-identified patent and that said Letters Patent is hereby corrected as shown below:

Column 3,     line 22, after "is" insert --structurally--;

line 23, delete "structurally";

line 32, after "actuator" insert --is provided--;

line 40, change ", according" to --. According;

line 41, after "invention" insert --, the lens actuator--;

line 44, after "respectively" insert --,--;

line 47, after "respectively" insert --,--;

line 48, after "performing" insert --a--;

line 55, after "respectively" insert --,--.

Column 4,     line 30, after "," insert --the--;

line 39, after "12" insert --,--;

line 44, after "respectively" insert --,--;

line 46, after "of" insert --a--;

line 47, after "," insert --an--;

line 57, after "respectively" insert --,--.

UNITED STATES PATENT AND TRADEMARK OFFICE
CERTIFICATE OF CORRECTION

PATENT NO. : 5,864,524

DATED : January 26, 1999

INVENTOR(S) : Akihiro SAKAGUCHI

It is certified that error appears in the above-identified patent and that said Letters Patent is hereby corrected as shown below:

Column 5, line 4, change "said" to --the--;

line 14, after "effect" insert --a--;

line 26, after "if" insert --a--;

line 40, after "2" insert --,-- and after "then" delete ",";

line 45, after "respectively" insert --,--;

line 49, change "proper" to --properly--;

line 61, after "," insert --a--.

Column 6   line 6, after "," insert --a--;

line 18, change "improved remarkably" to --remarkably improved--;

line 19, after "that" insert --an--;

line 22, after "Also" insert --,-;

line 33, after "mounted" insert --, is made--;

line 35, after "mounted" insert --,--;

line 43, after "," insert --a--;

line 50, after "to" insert --a--;

line 56, after "," insert --a--;

line 59, after "of" insert --the--;

UNITED STATES PATENT AND TRADEMARK OFFICE
CERTIFICATE OF CORRECTION

PATENT NO. : 5,864,524

DATED : January 26, 1999

INVENTOR(S) :

Akihiro SAKAGUCHI

It is certified that error appears in the above-indentified patent and that said Letters Patent is hereby corrected as shown below:

Column 6,      line 62, after "arrow" insert --, as--;

line 63, after "," insert --including--.

Column 7,      line 1, after "when" insert --a--;

line 2, after "," insert --a--;

line 7, after "When" insert --a--;

line 11, change "rotated excessively" to --excessively rotated--;

line 12, change "when" to --the--;

line 13, after "of" insert --performing a--;

line 16, after "of" insert --performing a--;

line 18, after "," insert --a--;

line 25, after "," insert --the--;

line 33, change "of" to --on-- and after "6" insert --,--;

line 34, after "7" insert --,-- line 36, after "position" insert --so--;

line 61, after "," insert --an--;

line 63, after "achieve" insert --an--.

UNITED STATES PATENT AND TRADEMARK OFFICE
CERTIFICATE OF CORRECTION

PATENT NO. : 5,864,524
DATED : January 26, 1999
INVENTOR(S) : Akihiro SAKAGUCHI     Page 7 of 7

It is certified that error appears in the above-indentified patent and that said Letters Patent is hereby corrected as shown below:

Column 8,   line 5, change "formed spherically" to --spherically formed--;

line 14, change "formed spherically" to --spherically formed--;

line 37, after "be" insert --accurately--;

line 38, delete "accurately";

line 43, change "simplified structurally" to --structurally simplified--;

line 46, change "proper" to --properly--.

Signed and Sealed this

Twenty-second Day of August, 2000

*Attest:*

Q. TODD DICKINSON

*Attesting Officer*     *Director of Patents and Trademarks*